United States Patent
Yamamoto et al.

(10) Patent No.: US 6,424,742 B2
(45) Date of Patent: Jul. 23, 2002

(54) IMAGE PROCESSING APPARATUS FOR DISCRIMINATING IMAGE FIELD OF ORIGINAL DOCUMENT PLURAL TIMES AND METHOD THEREFOR

(75) Inventors: Naofumi Yamamoto, Tokyo; Haruko Kawakami; Gururaj Rao, both of Yokohama, all of (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,929

(22) Filed: Aug. 20, 1998

(30) Foreign Application Priority Data

Aug. 20, 1997 (JP) .............................................. 9-223673

(51) Int. Cl.[7] ................................................. G06K 9/34
(52) U.S. Cl. ...................................... 382/173; 382/162
(58) Field of Search ................................ 382/173, 176, 382/162, 237, 260, 205, 172, 164, 165, 274; 358/515, 538, 540, 462, 465, 1.9; 395/109

(56) References Cited

U.S. PATENT DOCUMENTS

| | | | | |
|---|---|---|---|---|
| 4,710,822 A | | 12/1987 | Matsumnawa | 358/280 |
| 4,741,046 A | * | 4/1988 | Matsunawa | 382/173 |
| 4,782,399 A | | 11/1988 | Sato | 358/280 |
| 5,018,024 A | | 5/1991 | Tanioka | 358/457 |
| 5,073,953 A | * | 12/1991 | Westdijk | 382/173 |
| 5,280,367 A | | 1/1994 | Zuniga | 358/462 |
| 5,293,430 A | * | 3/1994 | Shiau et al. | 382/173 |
| 5,850,474 A | * | 12/1998 | Fan et al. | 382/173 |
| 5,956,468 A | * | 9/1999 | Ancin | 395/109 |

FOREIGN PATENT DOCUMENTS

EP 0 855 830 7/1998

* cited by examiner

Primary Examiner—Phuoc Tran
(74) Attorney, Agent, or Firm—Foley & Lardner

(57) ABSTRACT

An image processing apparatus incorporating a field separating section for separating an original image into plural types of fields in response to a first image signal obtained at a rough density of the supplied original image, a characteristic value calculating section for calculating a characteristic value of the original image in response to a second image signal of the original image obtained at a density which is higher than the rough density, and a discrimination section for discriminating an image field of the original image in accordance with the characteristic value to correspond to the type of the field.

12 Claims, 14 Drawing Sheets

| IMAGE FIELD DISCRIMINATION SECTION | DETERMINATION FORMULA | IMAGE FIELD SIGNAL DT |
|---|---|---|
| FIRST IMAGE FIELD DISCRIMINATION SECTION | if DD>T1<br>if DA>T2<br>else | 2<br>2<br>0 (SMOOTHING GRADATION FIELD) |
| SECOND IMAGE FIELD DISCRIMINATION SECTION | if DD>T3<br>if DA>T4 and DS>T5<br>else | 2<br>2<br>0 |
| THIRD IMAGE FIELD DISCRIMINATION SECTION | if DD<T6<br>else | 0<br>1 (EDGE OF GRADATION FIELD) |
| FOURTH IMAGE FIELD DISCRIMINATION SECTION | always | 0 |
| FIFTH IMAGE FIELD DISCRIMINATION SECTION | DD<T7<br>else | 0<br>1 |

FIG. 8

| IMAGE FIELD DISCRIMINATION SECTION | DETERMINATION FORMULA | IMAGE FIELD SIGNAL DT |
|---|---|---|
| FIRST IMAGE FIELD DISCRIMINATION SECTION | if SX>T1 OR SB>T2<br>if DD>T3<br>else | DT=2<br>DT=2<br>DT=0 |
| SECOND IMAGE FIELD DISCRIMINATION SECTION | if SX>T3 OR SB>T4<br>else | DT=2<br>DT=0 |
| THIRD IMAGE FIELD DISCRIMINATION SECTION | if SX>T5 OR SB>T6<br>else | DT=1<br>DT=0 |
| FOURTH IMAGE FIELD DISCRIMINATION SECTION | always | DT=0 |
| FIFTH IMAGE FIELD DISCRIMINATION SECTION | if SX>T7 OR SB>T8<br>else | DT=0<br>DT=0 |

FIG. 20

IMAGE PROCESSING APPARATUS FOR DISCRIMINATING IMAGE FIELD OF ORIGINAL DOCUMENT PLURAL TIMES AND METHOD THEREFOR

BACKGROUND OF THE INVENTION

The present invention relates to a method of discriminating the attribute of an image, an image processing apparatus adopting the discrimination method and an image forming apparatus.

Recently, when an image incorporating characters and gradation images mixed therein is treated, recording for obtaining a hard copy is an issue that needs to be resolved. An electrophotographic method is in common use as a method of recording a digital image. The foregoing method has unsatisfactory performance of expressing a density of two to several levels per picture point to be recorded. Therefore, when a gradation image is expressed, a pulse width modulation method or the like must be employed. The pulse width modulation method is broadly divided into a one-pixel modulation method and a two-pixel modulation method in terms of the period of pulses in the pulse width modulation. Although the former method is able to clearly record characters because of excellent resolution, the foregoing method is of inferior gradation expressing characteristic. On the other hand, the latter method excels in gradation expressing characteristic which enables a photograph or the like to smoothly be reproduced. However, the latter method is of inferior resolution. Although the modulation methods are able to realize either of the resolution and the gradation expressing characteristic, both of the foregoing requirements cannot simultaneously be realized when a recording operation is performed.

To record an image such that both of the resolution and the gradation expressing characteristic are realized, an image field discrimination process is performed. That is, an image which must be recorded is discriminated into fields, for example, photographs, in which the gradation expressing characteristic is of importance and fields, for example, characters or line drawings, in which the resolution is of importance. In accordance with a result of the discrimination, the recording method is switched.

As an image field discrimination method, a method is known in which the difference in change in local densities between gradation fields and character fields or the difference in the local patterns is used. As an example of the former method, a method has been disclosed in Jpn. Pat. Appln. KOKAI Publication No. 58-3374. The method has steps of dividing an image into small blocks, and calculating the difference between a highest density and a lowest density in each block. Moreover, if the difference is larger than a threshold value, a discrimination is made that the subject block is a character image field. If the difference is smaller than the threshold value, a discrimination is made that the subject block is a gradation image field. The above-mentioned method is able to perform accurate discrimination if the image is composed of only continuous gradation images, such as photographs, and characters. However, there arises a problem of unsatisfactory discrimination accuracy in a field, for example, a dot image, in which local density change frequently occurs. There arises another problem in that a gradation image having a sharp edge thereon is incorrectly discriminated as a character field. As an example of the latter method, a method has been disclosed in Jpn. Pat. Appln. KOKAI Publication No. 60-204177. The foregoing method has steps of Laplacian-filtering an image; binarizing the image; and performing discrimination in accordance with a shape of, for example, a 4×4 pattern. The above-mentioned method is able to discriminate even a dot image. However, also the above-mentioned method had a problem in that an edge portion on a gradation image can frequently incorrectly be discriminated as a character image.

If the foregoing methods are combined with each other or if a method is furthermore employed in which correction is performed in accordance with results of discrimination of surrounding pixels by using a characteristic that an image field is constant over a somewhat wide area, the discrimination accuracy can be improved. However, the scale of the circuit results in limitation of reference fields to several pixels. Thus, a satisfactory discrimination accuracy cannot be realized.

As described above, the method using information of the local density among the conventional image field discrimination methods suffers from a problem in that discrimination accuracy of an edge portion of a gradation image having a micro structure similar to that of a character and a rough dot image portion deteriorates. Another problem arises in that a character formed by thick lines and a portion in lines cannot easily be discriminated as a character.

The known method of macroscopically analyzing the structure of a document image, which is able to accurately discriminate existence of a character or a gradation image, suffers from unsatisfactory position-resolving power. Thus, accurate discrimination in pixel unit cannot easily be performed.

BRIEF SUMMARY OF THE INVENTION

An object of the present invention is to provide an image field discrimination method which is capable of realizing both excellent discrimination accuracy and excellent position resolving power and with which a portion in a characteristic can correctly be discriminated, an image processing method using the same and an image forming apparatus.

According to one aspect of the present invention, there is provided an image processing apparatus comprising: the field separating means for separating an original image into plural types of fields in response to a first image signal obtained at a first density of the supplied original image; characteristic value calculating means for calculating a characteristic value of the original image in response to a second image signal of the original image obtained at a second density which is higher than the first density; discrimination means for discriminating an image field of the original image in accordance with the characteristic value calculated by the characteristic value calculating means to correspond to the type of the field separated by the field separating means; and an image processing means for processing a predetermined image processes corresponding to a result of discrimination of the image field performed by the discrimination means, on the second image signal.

The present invention having the above-mentioned structure is different from a conventional method in which discrimination of an image field is performed by one time. The present invention has the structure that discrimination of a field in response to a rough signal of an original image is performed. Moreover, a characteristic value indicated by a dense signal of the original image is obtained. Then, final discrimination of the field is, in each field indicated by the rough signal, performed in accordance with the characteristic value. As a result, further accurate discrimination of a field can be performed.

That is, the conventional method has the structure that discrimination of a field is performed only one time in response to a dense signal. Thus, incorrect discrimination of an edge in a photograph field as a character field can easily be made. However, the present invention arranged to first perform macro field discrimination in accordance with the rough signal is able to prevent incorrect discrimination that an edge in the foregoing photograph field is a character. Since the second process is performed such that the field is discriminated in accordance with the characteristic value indicated by the dense signal, a micro character field in a character field and a background field are discriminated from each other. Thus, the character field and the background field can individually be detected. Since high contrast similar to that of a character field is not provided for the background field, that is, since low contrast is provided for the background field, generation of noise on the background can be prevented.

Therefore, the field discrimination according to the present invention and arranged to perform two steps is able to prevent incorrect discrimination between a photograph field and a character field, detect a background field in a character field and thus realize a background field free from any noise.

Also a method according to the present invention enables both of a character field and a gradation field to satisfactorily accurately be discriminated from each other because of the above-mentioned reason.

The discrimination of an image field according to the present invention can favorably be employed in a digital color image forming apparatus. In this case, accurate discrimination of an image field can be performed and an image in a satisfactory state can be formed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is diagram showing a method which is employed by the micro discriminxation section and in which an image field is discriminated;

FIG. 20 is a diagram showing an image field discrimination method adapted to the micro discrimination section according to the fourth embodiment.

DETAILED DESCRIPTION OF THE INVENTION

Embodiments of the present invention will now be described with reference to the drawings.

First Embodiment

Figure 1:
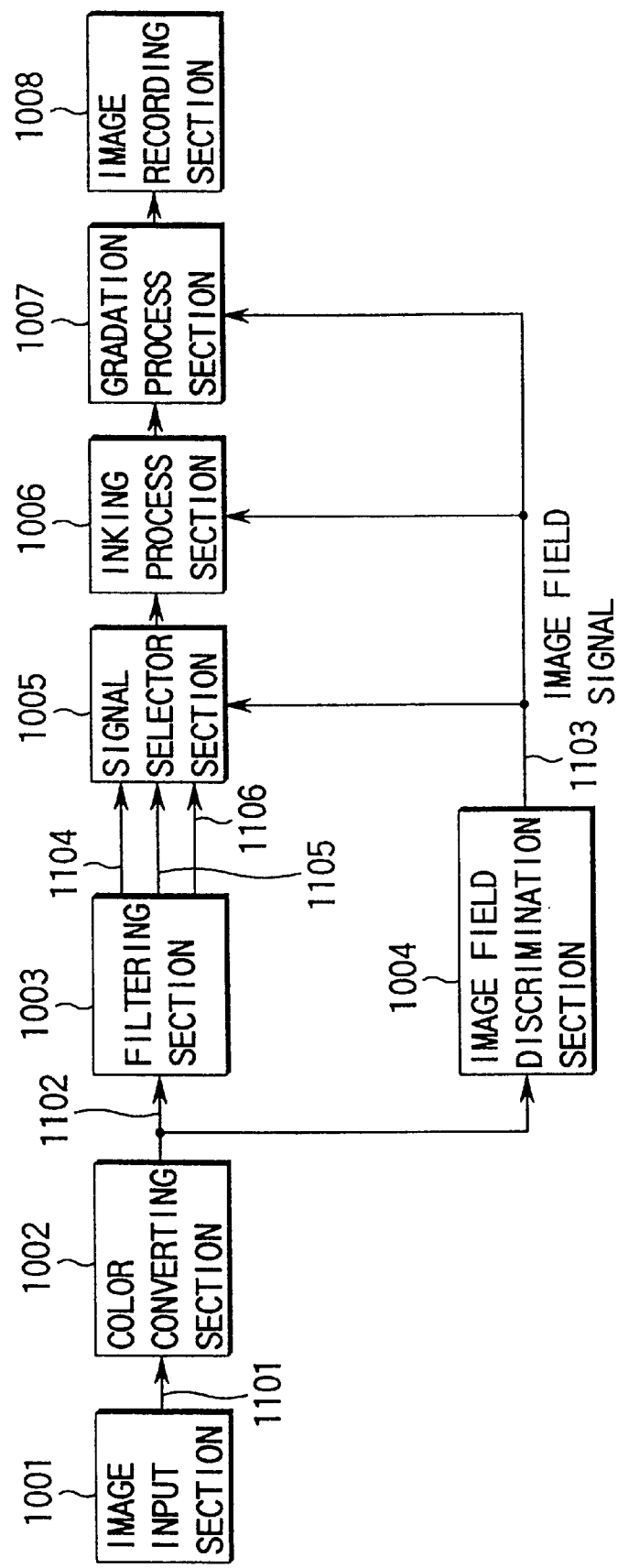
FIG. 1 is a block diagram showing the structure of an essential portion of a digital color copying machine according to a first embodiment of the present invention.

FIG. 1 is a diagram showing an example of the structure of an essential portion of an image forming apparatus (a digital color copying machine which is hereinafter simply called an image copying machine or a copying machine) having an image processing apparatus to which an image field discrimination method according to the present invention is applied.

The image copying machine incorporates an image input section 1001, a color converting section 1002, an image field discrimination section 1004, a filtering section 104, a signal selector section 1005, an inking process section 1006, a gradation process section 1007 and an image recording section 1008. The image field discrimination method according to the present invention is applied to the image field discrimination section 1004. Note that editing processes including an expansion/reduction process and trimming and masking processes not shown do not concern the present invention. Therefore, sections for performing the above-mentioned processes are disposed, for example, immediately posterior to the image input section 1001.

The image input section 1001 reads an image of an original document so as to produce an output of a color image signal 1101. The color image signal 1101 indicates, for example, each reflectance of R, G and B of each pixel of the original document, the output of the color image signal 1101 being produced in the form of three time-sequential signals obtained by two-dimensionally scanning information of each pixel. At this time, the number of read pixels per unit length is called a pixel density. The read density in this embodiment is, for example, 600 dpi, that is, 600 pixels per 25.4 mm. Note that prescanning is performed at a low density of, for example, 200 dpi in a vertical direction (in a sub-scanning direction) as described later.

The color converting section 1002 converts the color image signal 1101 indicating the reflectance of RGB into a color image signal 1102 denoting the density of a coloring material (for example, YMC) to be recorded. The reflectance of RGB and that of YMC usually hold a very complicated non-linear relationship. Therefore, a 3D table lookup method or a method in which a ID table lookup and a 3×3 matrix are combined with each other is employed to perform the foregoing converting process. Specific structures of the foregoing methods are disclosed in, for example, Jpn. Pat. Appln. KOKAI Publication No. 1-055245 and Jpn. Pat. Appln. KOKAI Publication No. 61-007774.

The image field discrimination section 1004 discriminates the attribute of the pixel in the supplied (color) image signal 1102 to produce an output of an image field signal 1103. In this embodiment, the attribute of a pixel includes three types which are "character", "edge of gradation" and "smooth gradation". Therefore, the image field signal 1103 is a signal having any one of values of the three types.

Figure 2:
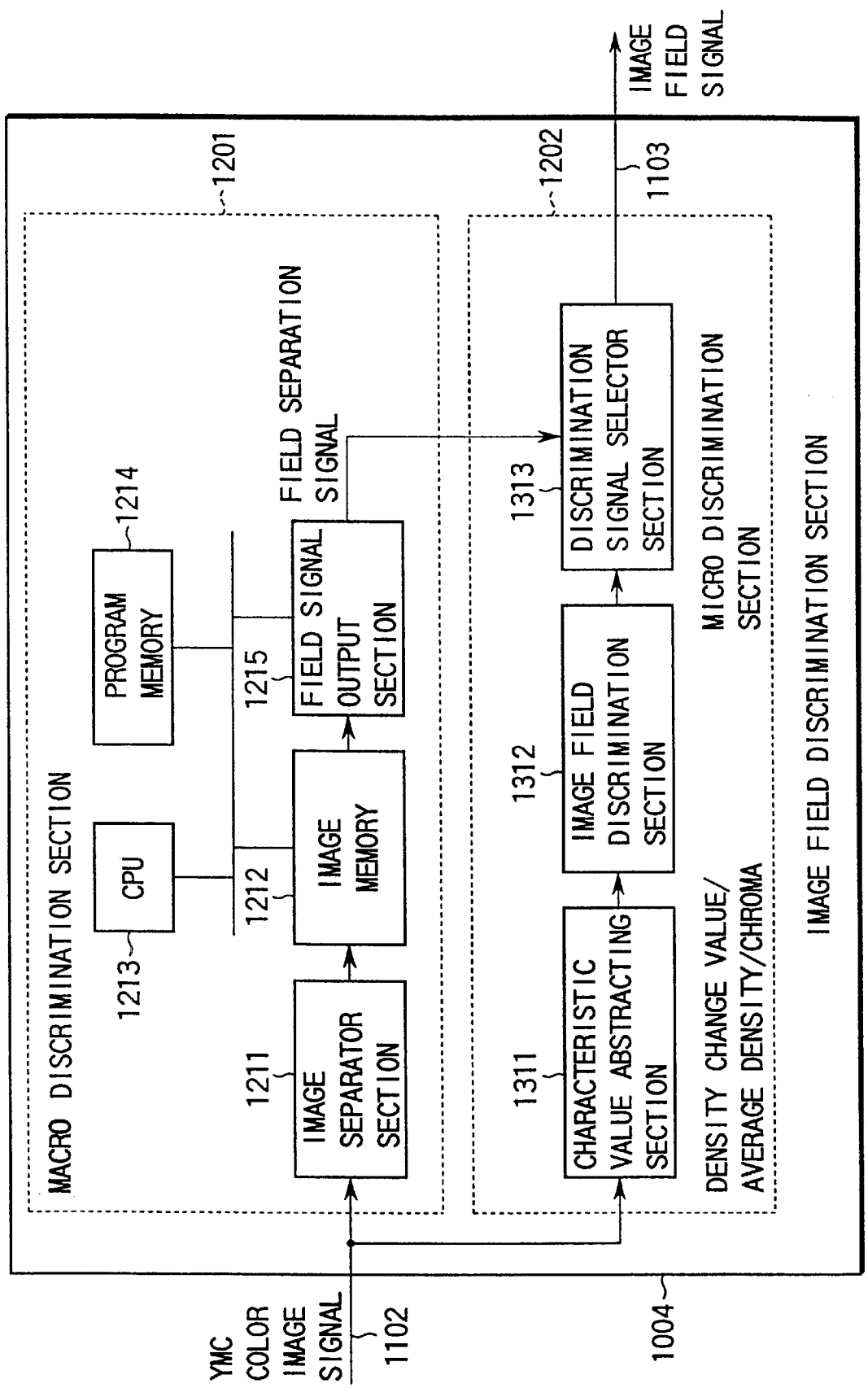
FIG. 2 is a block diagram showing an example of the structure of an image field discrimination section.

The schematic structure of the image field discrimination section 1004 will now be described. As shown in FIG. 2, the image field discrimination section 1004 incorporates a macro discrimination section 1201 and a micro discrimination section 1202. The macro discrimination section 1201 incorporates an image separator section 1211, an image memory 1212, a CPU 1213, a program memory 1214 and a field signal output section 1215. The micro discrimination section 1202 incorporates a characteristic value abstracting section 1311 for abstracting a plurality of (for example, three) characteristic values, an image field discrimination section 1312 for discriminating image fields of a plurality of (for example, five) types and a discrimination signal selector section 1313. The image field discrimination section 1004 is a section to which the image field discrimination method according to the present invention is applied. Therefore, the detailed structure and operation of the image field discrimination section 1004 will be described later.

The filtering section 1003, subjects the YMC color image signals 1102 to a plurality of filtering processes including a sharpening process and a smoothing process in parallel. In this embodiment, three processes including a strong edge emphasizing process, a weak edge emphasizing process and a smoothing filter process are performed so as to produce results of the processes as signals 1104, 1105 and 1106.

A copying machine usually treats a document image. An image of the foregoing type contains character images and gradation images mixed therein. The character image must sharply be reproduced, while the gradation of the gradation image must smoothly be reproduced. Since industrial printers and marketed printers usually use dot images to express gradation, dot image components must be removed.

Therefore, the signal selector section 1005 responds to an image field signal 1103 transmitted from the image field discrimination section 1004 to selectively switch outputs of the various filtering processes from the filtering section 1003. When the image field signal 1103 indicates a character, the YMC color image signal 1102 is subjected to the strong edge emphasizing filter so as to produce an output of a result of the emphasizing process as the signal 1104 to a following section. When the image field signal 1103 indicates an edge of gradation, an output of a result obtained by subjecting the YMC color image signal 1102 to the weak edge emphasizing filter is produced as a signal 1105 to the following section. When the image field signal 1103 indicates smooth gradation, the YMC color image signal 1102 is subjected to the smoothing filter so as to produce an output of a signal 1106 obtained by removing noise and dot image components to the following section. As a result, the character image can sharply be reproduced and the gradation image can smoothly be reproduced.

Note that the filtering section 1003 may be arranged to receive the image field signal 1103 so as to selectively switch the filtering processes of the plural types in response to the image field signal 1103. In the foregoing case, the signal selector section 1005 may be omitted from the structure.

The inking process section 1006 converts the filtered YMC color image signals into YMCK signals. Although black can be expressed by superimposing coloring materials in YMC, a general color recording process is performed by using YMCK coloring materials including a black coloring material because the black coloring material excels in high density as compared with that realized by stacking YMC coloring materials and the black coloring material is a low cost material.

As a specific converting method, an UCR (Under Color Reduction) method and a GCR method are known and actually used. A calculating formula of the GCR method is expressed in the following formula (1). In formula (1), CMY density signals are expressed as CMY and CMYK density signals to be transmitted are expressed as C', M', Y' and K'.

$$K'=k\cdot\min(C, M, Y)$$

$$C'=(C-K')/(1-K')$$

$$M'=(M-K')/(1-K')$$

$$Y'=(Y-K')/(1-K') \qquad (1)$$

The gradation process section 1007 will now be described. When an electrophotograph image is recorded, time for which a laser beam is turned on/off is modulated to express an intermediate density. The gradation process section 1007 performs the modulation process. Specifically, a pulse signal having a width in response to the density signal is generated. In response to the pulse signal, the laser beam is turned on/off. The structure is arranged such that a method in which the pulse position is shifted forwards and a method in which the pulse position is shifted rearwards can be switched.

Figure 3:
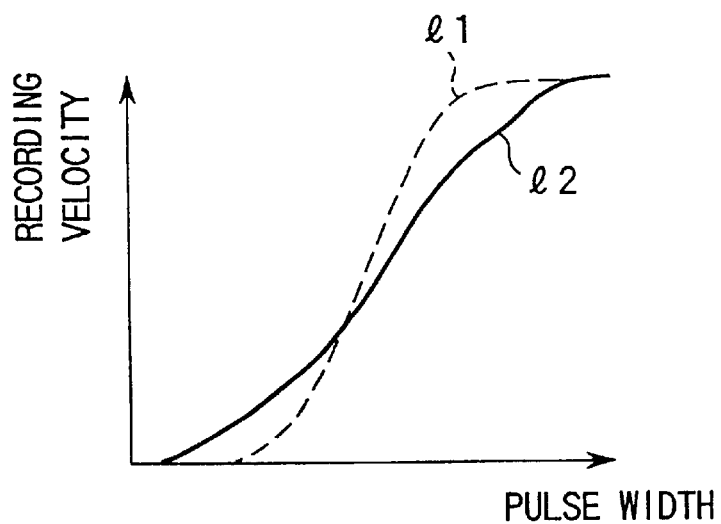
FIG. 3 is a graph showing characteristics of one-pixel modulation process and a two-pixel modulation process (the relationship between density signals and pulse widths)

The modulation includes a two-pixel modulation method and a one-pixel modulation method. The two-pixel modulation method is performed such that the pulse positions for odd-numbered pixels are shifted forwards and those for even-numbered pixels are shifted rearwards. On the other hand, the one-pixel modulation method is performed such that all of pixels are shifted forwards so as to be recorded. Since the one-pixel modulation method has a structure that pulses are turned on/off at cycles in one pixel units, recording can be performed at a resolution in one pixel units. On the other hand, the two-pixel modulation method arranged to have cycles in two pixel units encounters deterioration in the resolution as compared with the one-pixel modulation method. However, the pulse width for expressing the same density can be doubled, stability of the density can be improved. Thus, the gradation expressing characteristic can be improved as compared with the one-pixel modulation. An example of the relationship between density signals and recordable gradations is shown in FIG. 3. Referring to FIG. 3, a curve 11 indicates the relationship between density signals and pulse widths realized in a case of the one-pixel modulation method. A curve 12 indicates the relationship between density signals and pulse widths realized in a case of the two-pixel modulation. The one-pixel modulation method is a method suitable to record a character image, while the two-pixel modulation method is a method suitable to record a gradation image.

In this embodiment, selection of the two-pixel modulation process or the one-pixel modulation process is performed in response to the image field signal 1103. Specifically, when the image field signal 1103 indicates a character, the one-pixel modulation process is selected. When the image field signal 1103 indicates an edge of a gradation image or a smooth section, the two-pixel modulation process is selected. As a result, an image of a gradation field can be expressed with smooth gradation and a multiplicity of gradation levels. A sharp image of a character field can be recorded with a high resolution.

The image recording section 1008 will now be described. In this embodiment, the image recording section 1008 is adapted to an electrophotography method. The principle of the electrophotographic method will be described briefly. Initially, a laser beam or the like is modulated in response to an image density signal. Then, the modulated laser beam is applied to a photo-sensitive drum. An electric charge corresponding to a quantity of applied light is generated on the photosensitive surface of the photosensitive drum. Therefore, a laser beam is applied to scan the axial direction of the photosensitive drum to correspond to the scanning position of the image signal. Moreover, the photosensitive drum is rotated so as to be scanned. Thus, a two-dimensional charge distribution corresponding to the image signals is formed on the photosensitive drum. Then, the toner electrically charged by a developing unit is allowed to adhere to the surface of the photosensitive drum. At this time, toner in a quantity corresponding to the potential is allowed to adhere to the surface so that an image is formed. Then, the toner on the photosensitive drum is transferred to the surface of recording paper through a transfer belt. Finally, the toner is melted by a fixing unit so as to be fixed on the recording paper. The above-mentioned process is sequentially performed for each of the YMCK toner so that a full color image is recorded on the surface of the recording paper.

Operation of Image Forming Apparatus

Figure 4:
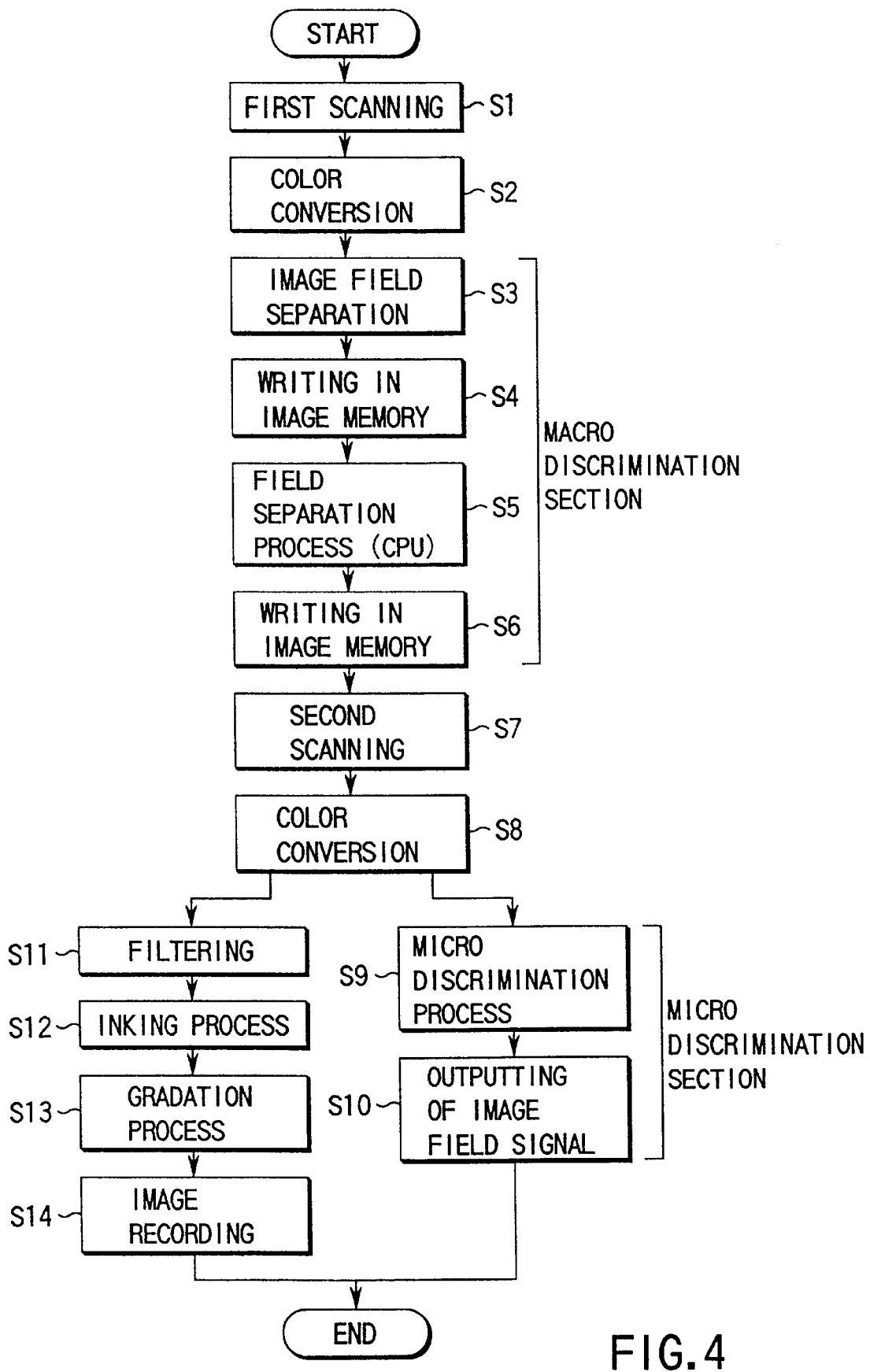
FIG. 4 is a flow chart of an operation of the digital color copying machine shown in FIG. 1.

The operation of the copying machine shown in FIG. 1 will now be described with reference to a flow chart shown in FIG. 4. The copying machine according to this embodiment is arranged to perform an operation for copying an image of an original document such that the image input section 1001 reads (scans) an image two times.

When a first operation for scanning an image is performed, the scanning operation is performed at a high velocity. Thus, the image is read at a rough density in the sub-scanning direction. A read image signal is color-converted by the color converting section 1002, and then supplied to the macro discrimination section 1201 of the image field discrimination section 1004 (steps S1 and S2). The image separator section 1211 in the macro discrimination section 1201 converts the image signal into a plurality of characteristic value signals (step S3). Thus, the contents of one page of the original document are written on the image memory 1212 (step S4). The above-mentioned process is performed simultaneously with the operation of the image input section 1001 for scanning the original document. After the original document has been scanned and image information has been recorded in the image memory 1212, the CPU 1213 performs a field separation process (step S5). A result of the field separation process is stored in the image memory 1212 (step S6).

After the field separation process has been completed by the CPU 1213, the image input section 1001 starts second scanning of the image (step S7). The second image scanning operation is performed such that the image is read at a low velocity. The image signal read by the image input section 1001 is subjected to a color conversion process in the color converting section 1002 (step S8), and then supplied to the image field discrimination section 1004 and the filtering section 1003. The image signal supplied to the image field discrimination section 1004 is supplied to the micro discrimination section 1202 so as to be supplied to the discrimination process (step S9). In synchronization with the second image scanning process, the field signal stored in the image memory 1212 is supplied through the field signal output section 1215 of the macro discrimination section 1201. As a result, the image field signal 1103 is transmitted from the discrimination signal selector section 1313 (step S10).

On the other hand, the image signal transmitted from the color converting section 1002 is allowed to pass through the filtering section 1003, the signal selector section 1005, the inking process section 1006 and the gradation process section 1007, and then transmitted to the image recording section 1008. Each of the signal selector section 1005, the inking process section 1006 and the gradation process section 1007 selects a signal and a process in response to the image field signal 1103 supplied in synchronization with execution of each process (steps S11 to S14).

Description of Image Field Discrimination Section

The image field discrimination section 1004 shown in FIG. 2 will now be described.

Structure and Operation of Macro Discrimination Section

The macro discrimination section 1201 performs field separation in accordance with the major structure of the image. In this embodiment, an image of an original document is separated into the following five types of fields.
1. Usual Character Field
2. Characters on Background
3. Continuous Gradation Field
4. Dot Gradation Field
5. Other Field The usual character field is a field in which a white background and characters and graphics are written on the white background. A major portion of usual documents are included in the above-mentioned field. The dot gradation field on a background has a gradation background which exists as the background of characters. The dot gradation field on a background is a field in which the background is divided in terms of colors to emphasize or classify a character or characters are superimposed on a gradation image to make a description. The former case is exemplified by a catalog, while the latter case is exemplified by a map. The continuous gradation field is a field having gradation, such as a human figure or a background image, and realized by recording the gradation image by a continuos gradation method, such as a silver salt photograph method or a sublimation type transfer method. Even if a dot image printing method is employed, an image field in which the dot images have sufficiently high frequencies with which dot image components are eliminated from the image signal is included in the continuous gradation field. Similarly to the continuous gradation field, the dot gradation field is a field of an image of a human figure or a background image. The dot gradation field is a field in which dot image printing is performed to express a gradation image.

A large portion of images is basically classified into any one of the four fields. Some images are not included in the foregoing classification or are difficult to be classified. For example, an image produced by computer graphics, such as a character string having gradation given to the entire field thereto, applies to the foregoing case. A field of the foregoing type is classified as "the other field".

The structure and operation of the macro discrimination section 1201 will now be described. The image separator section 1211 separates the color image signal 1102 transmitted from the color converting section 1002 into image data in a plurality of planes in accordance with the difference in the density of peripheral pixels and a state of chroma. Separated image data is sequentially stored in the image memory 1212. In this embodiment, the image memory 1212 has a capacity corresponding to the number of the planes of the images. Thus, the separated image signals for one page are completely stored in the image memory 1212.

The image separator section 1211 calculates brightness I and chroma S from the YMC color image signal 1102 in accordance with the following formula (10):

$$I=(C+M+Y)/3$$

$$S=(C-M)2+(M-Y)2+(Y-C)2 \qquad (2)$$

Figure 5:
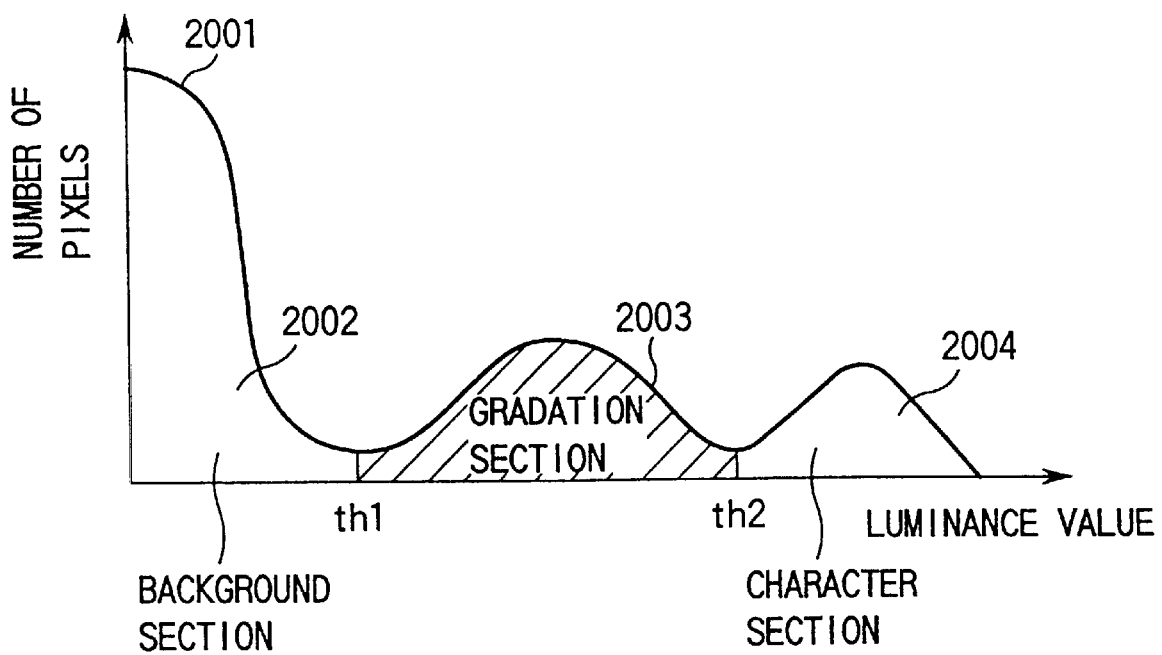
FIG. 5 is a histogram about brightness values in a general document.

The brightness value I is a quantity indicating the density of an image. The brightness value I is "0" in a case of a white image, while the same is "1" in a case of a black image. The chroma S is "0" in a case of achromatic color, while the same is enlarged in proportion to the degree of chromatic color. Then, change in the brightness value I in the scanning direction is detected, and then discriminates a field in which the brightness value I is changed as a dot image. Then, histogram with respect to the brightness value I in a certain field is produced. As shown in FIG. 5, the histogram of a usual original document has three peaks, that is, a background density, a gradation density and a black density. Lowest densities among the foregoing peaks are made to be th1 and th2. Pixels other than the dot images are discriminated such that pixels having the brightness value I which is not larger than the threshold value th1 are discriminated as the background pixels, those having the threshold value larger than the threshold value th1 and not larger than the threshold value th2 are discriminated as the gradation pixels and those having the threshold value which is larger than the threshold value th2 are discriminated as the character pixels. Moreover, threshold value th3 for the chroma S is discriminated. Pixels having a chroma S which is smaller than the threshold value th3 and a brightness value I which is larger than the threshold value th2 are discriminated as black pixels. The other pixels are discriminated as gray pixels. That is, in accordance with the rough image signals of the original image, the original image is classified into seven types, which are a character image (an image containing dense pixels), a gradation image (an image containing pixels having a low density similar to that of a photograph), a background image (an image containing pixels having a very low density similar to that of a background), a color image (an image containing colored pixels), a gray image (an image containing gray pixels), a black image (an image containing black pixels) and a dot image (an image having the density which is frequently and greatly changed similarly to a dot image). Classified image data is temporarily stored in the image memory 1212 together with a result of the classification (information about the field separation). Note that each image is made to be a binary image whether or not the image has the foregoing characteristic.

Figure 9:
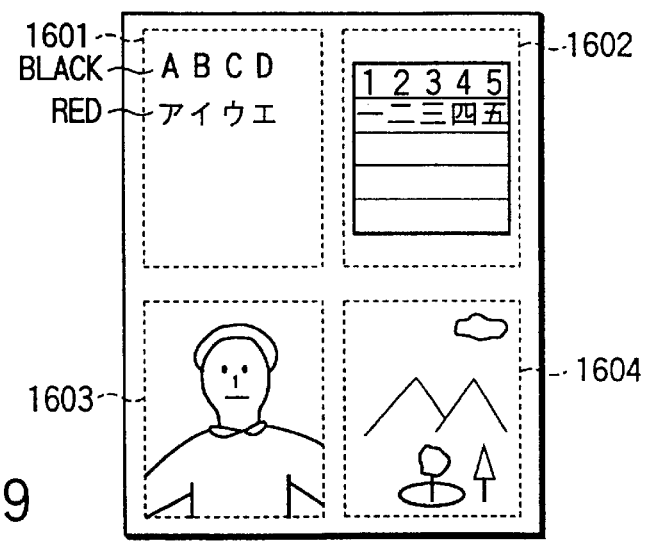
FIG. 9 is a diagram showing an example of an image of an original.

In accordance with a program code stored in the program memory (for example, a ROM) 1214, the CPU 1213 performs a field discrimination process while the CPU 1213 makes a reference to the contents of separated image data stored in the image memory 1212 so that information about field separation is modified. Then, modified information about field separation for e.g. each pixel written on the image memory 1212. That is, continuous pixels in the three image field, that is, the character image, the gradation image and the dot image, are unified so that connection fields in rectangular units are produced. Then, the characteristic value of each connection field is calculated so that the type of the field is discriminated. The types of the fields include, for example, the usual character field mainly containing characters and a photograph field which is a gradation image. The position and size of the connection field (information of a connection field) and the type of the field are again stored in the image memory 1212. Then, pixels having overlapping connection fields of different types are subjected to, for example, a process as shown in FIG. 9. Thus, in accordance with information of a connection field and the type of the field, the type of the pixel is discriminated.

Figure 6:
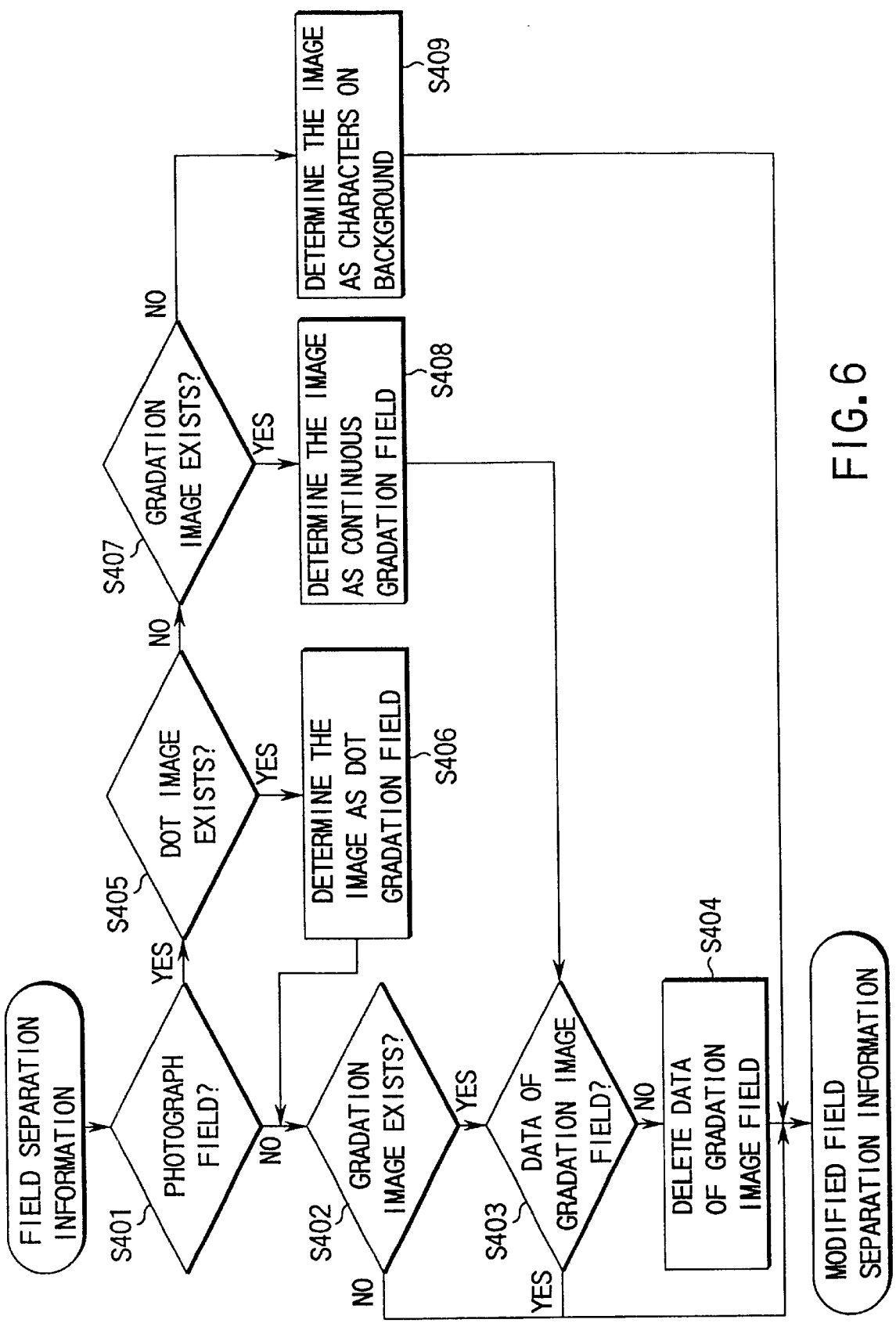
FIG. 6 is a flow chart of an example of a procedure which is performed by a macro discrimination section and in which the type of a field of pixels in which connection fields of different types overlap is discriminated.

The procedure of the flow chart shown in FIG. 6 is performed such that a field discriminated as a photograph field (step S401) is discriminated as a dot gradation field if a dot image exists in the foregoing field (steps S405 and S406). If a gradation image exists, the field is discriminated as a continuous gradation field (steps S407 and S408). If both of the dot image and the gradation image do not exist, the field is discriminated as characters on a background (steps S407 and S409). If the field is not the photograph field, gradation image data is deleted from the field containing a gradation image and the field discriminated in step S408 as a continuous gradation field (steps S402 to S404). As a result of the above-mentioned process, at least four types of modified information of field discrimination are stored in the image memory 1212.

Information about field separation stored in the image memory 1212 is read by the field signal output section 1215 in synchronization with a second reading signal from the image input section 1001 so as to be transmitted as a field separation signal. Since the density of pixels indicated with the information about field separation in the image memory 1212 and the density of pixels indicated with the image signal from the image input section 1001 are different from each other, the density denoted by the field separation signal is converted so that the two pixel densities are matched with each other before transmittance.

In this embodiment, the field separation signal is expressed in a 3-bit signal form. The relationship between the values of the 3-bit signals and the fields are as follows:

| Values Of Region Separation Signals | Regions |
|---|---|
| "0" | Usual Character Field |
| "1" | Characters on Background |
| "2" | Continuous Gradation Field |
| "3" | Dot Gradation Field |
| "4" | Other Fields |

Another arrangement may be employed in which the field separation signal is formed into a 5-bit signal and the 5-bit signals represent the five fields, respectively.

Structure and Operation of Micro Discrimination Section

Figure 7:
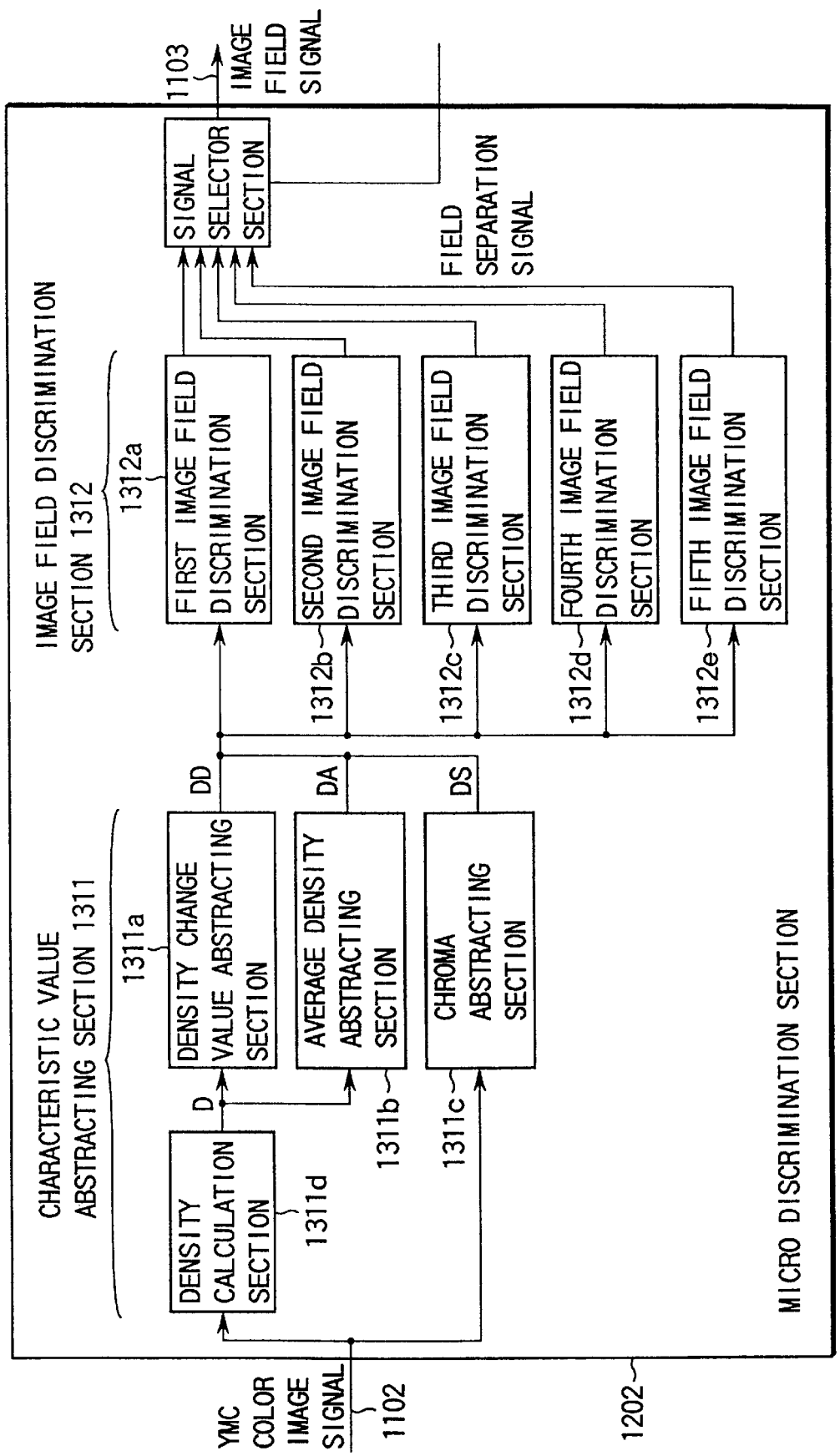
FIG. 7 is a block diagram showing the structure of a micro discrimination section.

The micro discrimination section 1202 discriminates the field by paying attention to a micro difference in the image. The detailed structure of the micro discrimination section 1202 is shown in FIG. 7. The micro discrimination section 1202 comprises a characteristic value abstracting section 1311 for abstracting three characteristic values, an image field discrimination section 1312 for discriminating five types of image fields and a discrimination signal selector section 1313.

The characteristic value abstracting section 1311 incorporates a density calculation section 1311d, a density change value abstracting section 1311a for abstracting the three characteristic value, an average density abstracting section 1311b and a chroma abstracting section 1311c.

The density change value abstracting section 1311a abstracts the degree of change in the density of a portion around a pixel of interest. Initially, the density calculation section 1311d calculates density signal D from the YMC color image signal 1102. The density is calculated such that a weighted linear sum of the YMC density signals is calculated as indicated with the following formula (2):

$$D = K_y \cdot Y + K_m \cdot M + K_c \cdot C \quad (3)$$

where Ky=0.25, Km=0.5 and Kc=0.25

Then, the density change value abstracting section 1311a calculates change in the density in a 3 pixel×3 pixel block in the vicinity of the pixel of interest so as to transmit a density change value signal DD. Assuming that densities of pixels in the 3 pixel×3 pixel block are D1, D2, D3, . . . , D9, the density change value signal DD can be expressed by the following formula (3), in which Max (A1, A2, . . . , An) indicates a maximum value among A1, A2, . . . , An.

$$DD = \mathrm{Max}\,(|D1-D9|, |D2-D8|, |D3-D7|, |D4-D6|) \quad (4)$$

Note that the density change may be abstracted by another method, such as a BAT method disclosed in Jan. Pat. Appln. KOKOKU Publication No. 04-05305. A formula for calculating the density change value for use in the BAT method is as shown in the following formula (4):

$$DD = \mathrm{Max}\,(D1, D2, \ldots, D9) - \mathrm{Min}\,(D1, D2, \ldots, D9) \quad (5)$$

Although this embodiment has the structure that the reference field is 3 pixel×3 pixel range, another field may be employed, for example, a larger field, for example, a 4 pixel×4 pixel field or a 5 pixel×5 pixel field or a non-square 3 pixel×5 pixel field. If the reference field is enlarged, accuracy in abstracting the characteristic value is usually improved. However, the size of the hardware is enlarged. Therefore, an appropriate size adaptable to an object and required performance must be employed.

The average density abstracting section 1311b abstracts the density of the pixel of interest. That is, the average density abstracting section 1311b receives the density signal D transmitted from the density calculation section 1311d so as to calculate an average value of the density signals of 3 pixel×3 pixel field in the vicinity of the pixel of interest. Then, an output of a result of the calculation is produced as an average density signal DA. The average density signal DA indicates the density of a portion around the pixel of interest.

The chroma abstracting section 1311c abstracts the chroma of the pixel of interest. In response to YMC signals of the pixel of interest, a chroma signal DS expressed with the following formula (5) is generated:

$$DS = (C-M)2 + (M-Y)2 + (Y-C)2 \quad (6)$$

The chroma signal DS indicates the chroma of the pixel of interest, that is, whether or not the pixel of interest is colored. In a case of a achromic pixel, such as white, black or gray, DS is substantially "0". In a case of red or blue, DS is substantially a maximum value of "2".

Figure 11:
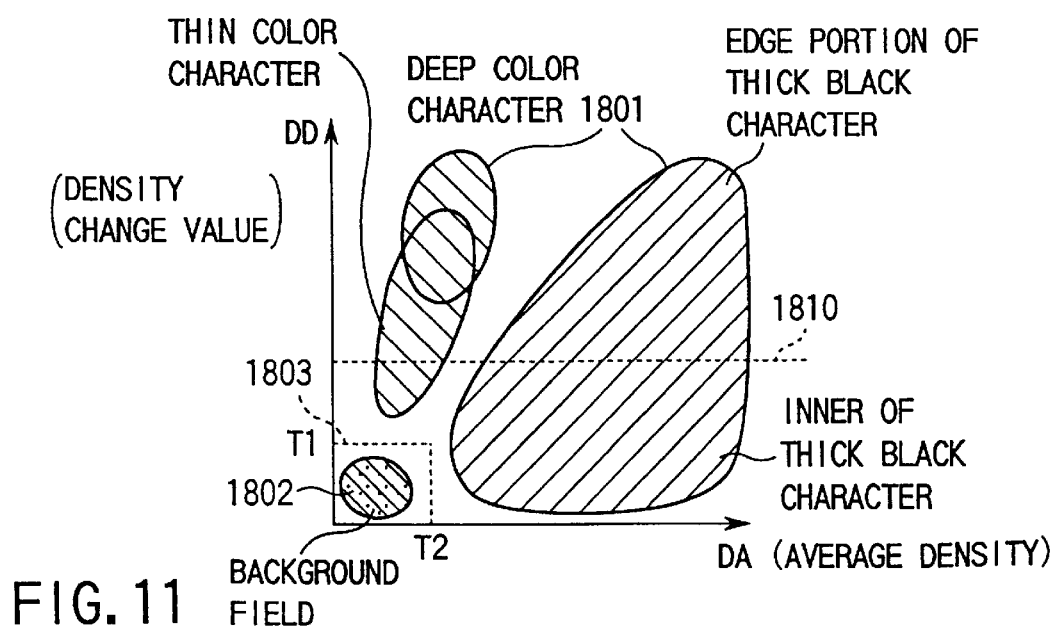
FIG. 11 is a graph showing an example of distribution of characteristic values (density change values and average densities) in an usual character field.
Figure 12A:
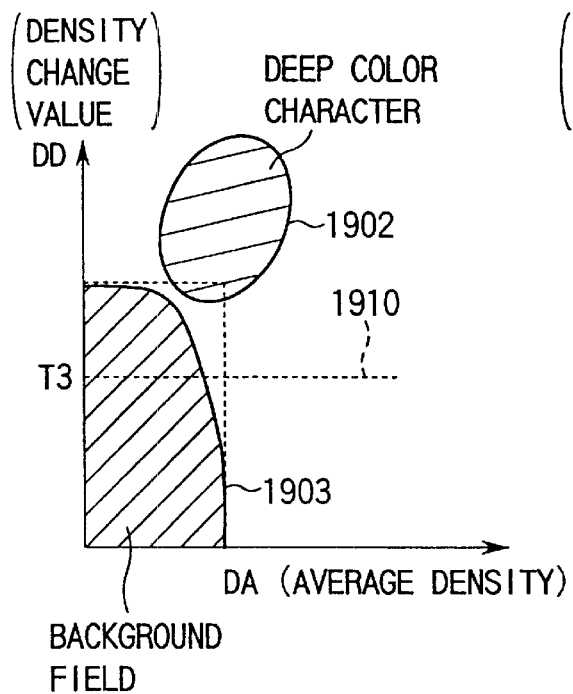
FIGS. 12A and 12B are graphs showing an example of distribution of characteristic values (density change values, average density values and chroma) in characters on a background.
Figure 13:
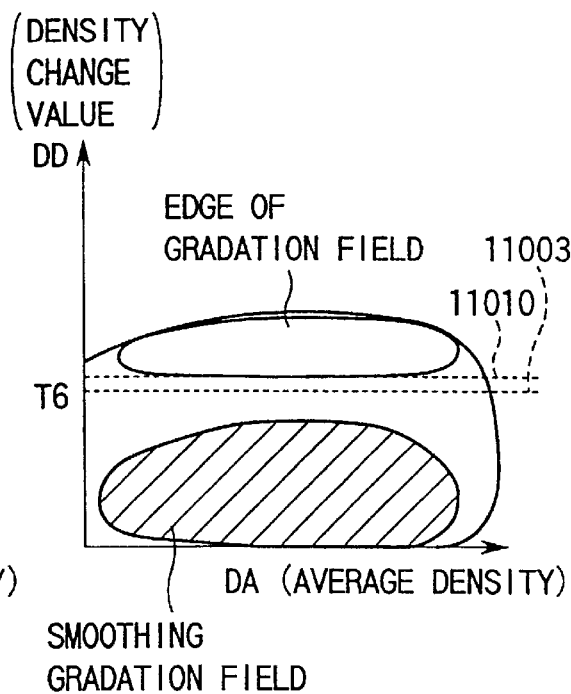
FIG. 13 is a graph showing an example of distribution of characteristic values (density change values and average densities), in a continuous gradation field.
Figure 12B:
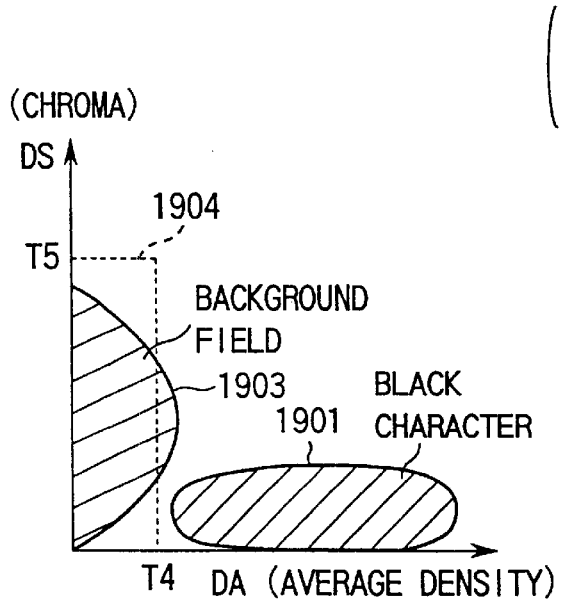

The image field discrimination section 1312 will now be described. The first to fifth image field discrimination sections 1312a to 1312e perform image field discrimination processes suitable to the five fields separated by the image separator section 1211 of the macro discrimination section 1201. The image field discrimination sections 1312a to 1312e receive characteristic value signals DD, DA and DS transmitted from the characteristic value abstracting sections 1311a to 1311c, discriminate an image field in response to the received signals and generate an image field signal DT. The generated image field signal is a 2-bit signal having values "0", "1" and "2". As for the relationship between the values and the image fields, a smooth gradation field is expressed when DT=0. An edge of a gradation image field is expressed when DT=1. An inside portion of a character and an edge are expressed when DT=2. The first to fifth image field discrimination sections 1312a to 1312e have different discrimination methods as will now be described with reference to FIG. 11. The first image field discrimination section 1312a discriminates a point having the density change value DD which is larger than a threshold value T1 and a point having an average density which is larger than a threshold value T2 as a character field (DT=2). The second image field discrimination section 1312b discriminates a point having the density change value DD which is larger than a threshold value T3 and a point having an average density which is higher than a threshold value T4 and chroma DS which is lower than a threshold value T5 as a character field (DT=2). The threshold value T3 is made to be a value larger than the threshold value T1. The third image field discrimination section 1312c discriminates a point having a density change value DD which is larger than a threshold value T6 as an edge (DT=1) of a gradation image field. The third image field discrimination section 1312c discriminates the point as a smooth gradation image field (DT=0) in the other cases. The fourth image field discrimination section 1312d is arranged to make the image field signal DT to always be a value "0". That is, the fourth image field discrimination section 1312d discriminates that all of fields are smooth gradation fields. The fifth image field discrimination section 1312e discriminates the point as an edge field (DT=1) if the density change value DD is larger than a threshold value T7 and discriminates the same as a gradation field (DT=0) if the density change value DD is smaller than the threshold value T7. Note that the threshold values T1 to T7 are predetermined threshold value for performing discrimination which must be discriminated appropriately adaptable to the resolution characteristic of an input system and that of the color conversion process section. Appropriate threshold values will be described later.

The discrimination signal selector section 1313 selects the five types of image field signals DT transmitted from the image field discrimination sections 1312a to 1312e in response to the field separation signal transmitted from the field signal output section 1215 of the macro discrimination section 1201. That is, when the fields separation signal is "0", an output signal from the first image field discrimination section 1312a is selected. When the field separation signal is "1", "2", "3"or "4", an output signal from the second, third, fourth or fifth image field discrimination sections is selected so as to be transmitted as the image field signal 1103.

As a result, the two steps of the field discrimination according to the present invention are performed. Thus, incorrect discrimination between a photograph field and a character field can be prevented. Moreover, a background field in the character field can be detected so that a background field free from any noise is realized.

Specific Operation

The specific operation will now be described such that the original document shown in FIG. 9 is taken as an example.

The original document shown in FIG. 9 has a unnatural structure as compared with a usual document image to easily describe the structure. A field 1601 is a field in which a sentence is written, the field 1601 being composed of black and red characters. A field 1602 is a table field in which black characters and ruled lines are drawn on a light color background which is sectioned in terms of color. A field 1603 is a field to which a gradation image realized by a silver salt photograph is pasted. A field 1604 is a field in which a gradation image is recorded by a dither method, that is, a dot image modulation method.

An operation will now be described with reference to FIG. 4, the operation being performed when the image of the original document is read by a scanner section not shown so that a copied image of the original document is transmitted from the printer section 2. As described above, the image of the original document shown in FIG. 9 is read by the image input section 1001 shown in FIG. 4, the image being read as an electric signal. Then, the electric signal is converted into the color image signal 1102 indicating the quantity of YMC toner in color converting section 1002.

Figure 10:
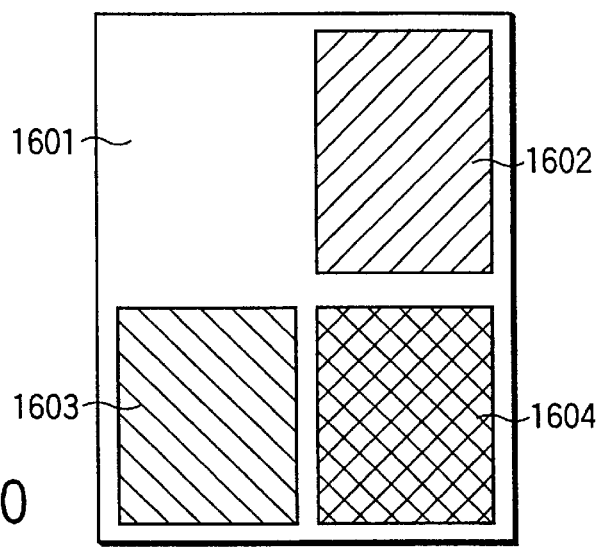
FIG. 10 is a diagram showing an example of a result of field separation of the image of the original document shown in FIGS. 12A and 12B.

In response to the YMC color image signal 1102, the image field discrimination section 1004 performs the image field discrimination process. The macro discrimination section 1201 performs the field separation in accordance with the discriminated characteristic of the structure. Since a reference to a wide field is made when the discrimination is performed, the field separation into the above-mentioned classifications can significantly accurately be performed. An example of a field separation signal denoting a result of the process performed by the macro discrimination section 1201 is shown in FIG. 10. In FIG. 10, fields having respective field separation signal values of "0", "1", "2" and "3" are expressed with white (a field 1601), diagonal lines facing lower left positions (a field 1602), diagonal lines facing lower right positions (a field 1603) and a cross diagonal lines (a field 1604). Note the illustrated example of the original document is free from "the other field".

The micro discrimination section 1202 discriminates the usual character field into a character field and the other field. Moreover, the micro discrimination section 1202 discriminates the characters on a background into a character field and the other field (a background field). The discrimination is performed in pixel units. The discrimination method employed by the micro discrimination section 1202 will now be described such that a characteristic value distribution in each field is described.

Figure 14:
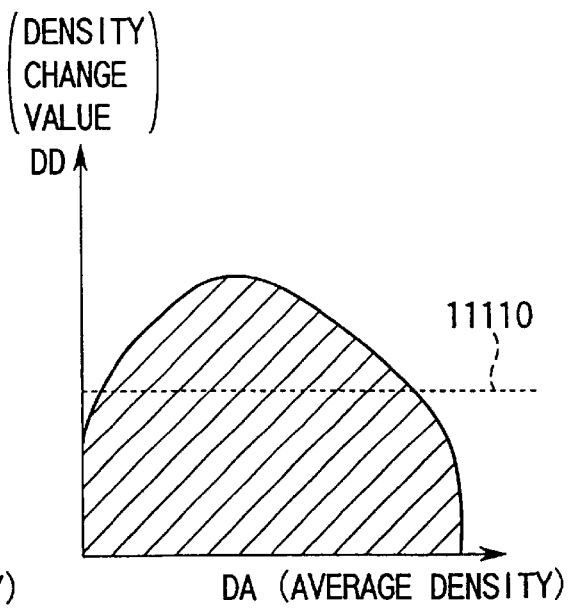
FIG. 14 is a graph showing an example of distribution of characteristic values (density change values and average densities) in a dot image field.

In the usual character field, characters are generally recorded on a white background. Characters in yellow or blue having very low densities and very fine characters having sizes of 5 points or smaller are sometimes recorded. An example of two-dimensional distribution between the density change value signals DD in the usual character fields and average density signals DA is shown in FIG. 14. Characters are distributed in a field 1801 shown in FIG. 14, while portions other than the characters are distributed about a field 1802 which is the center. Therefore, a boundary line 1803 causes the character field and the field other than the characters to be discriminated. The position of the boundary line corresponds to the threshold values T1 and T2 for performing discrimination.

Figure 15A:
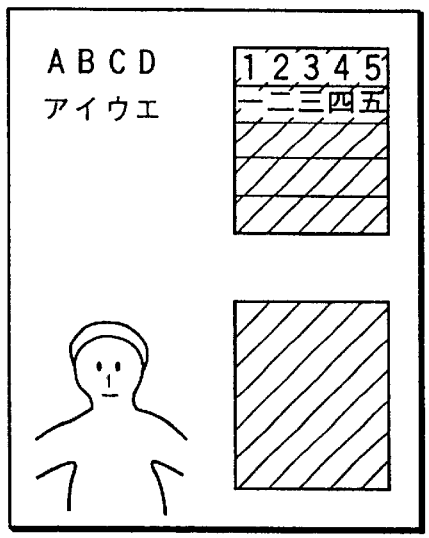
FIGS. 15A, 15B, 15C and 15D are diagrams showing examples of results of micro discrimination in each field of the image of the original document shown in FIG. 9 and separated in the macro discrimination section.
Figure 15B:
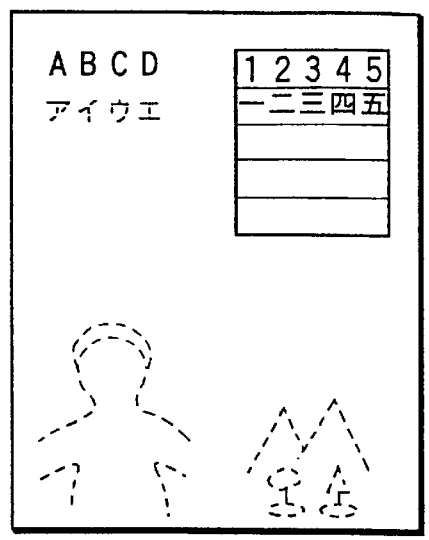

In the characters on a background, the characters are placed on a thin background. Although the background is sometimes formed with thin ink, the background is usually formed by dot image recording in the form of a usual printed matter. Since the visibility of the characters on the background excessively deteriorates, thin color and small characters are not usually employed in the character portion. In a major portion of the character portions, deep colors, such as black or red and a thick characters having a size of 7 points or larger are used. An example of two-dimensional distribution in the foregoing region between the density change value signals DD and average density signals DA is shown in FIG. 15A, and an example of two-dimensional distribution between average density signals DA and Chroma signals DS in FIG. 15B. In FIG. 15B, black characters are distributed in a field 1901, while color characters are distributed in a field 1902. In FIG. 15A, a distribution field of pixels in the background portion is distributed in a field 1903. At this time, the character field and the field other than the character field can be discriminated from each other by dint of the threshold values T4 and T5 indicated by a boundary line 1904, as shown in FIG. 15B. If the average density DA is high despite the density change value being "0" as shown in FIG. 15A, the threshold value T3 indicated with a boundary line 1901 enables the discrimination from characters to be performed. Therefore, the inside portion in a black character which cannot easily be discriminated by the conventional method can correctly be discriminated.

Figure 16:
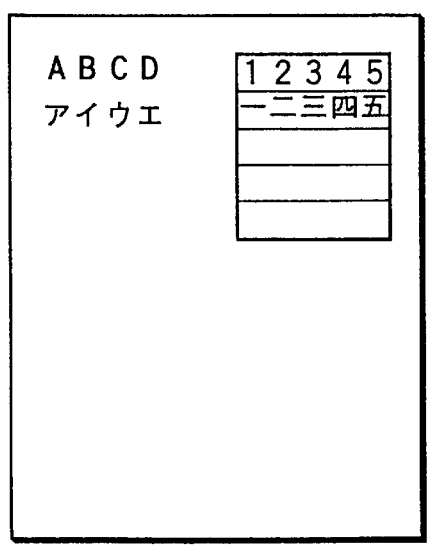
FIG. 16 is a diagram showing a final result of the discrimination.
Figure 17:
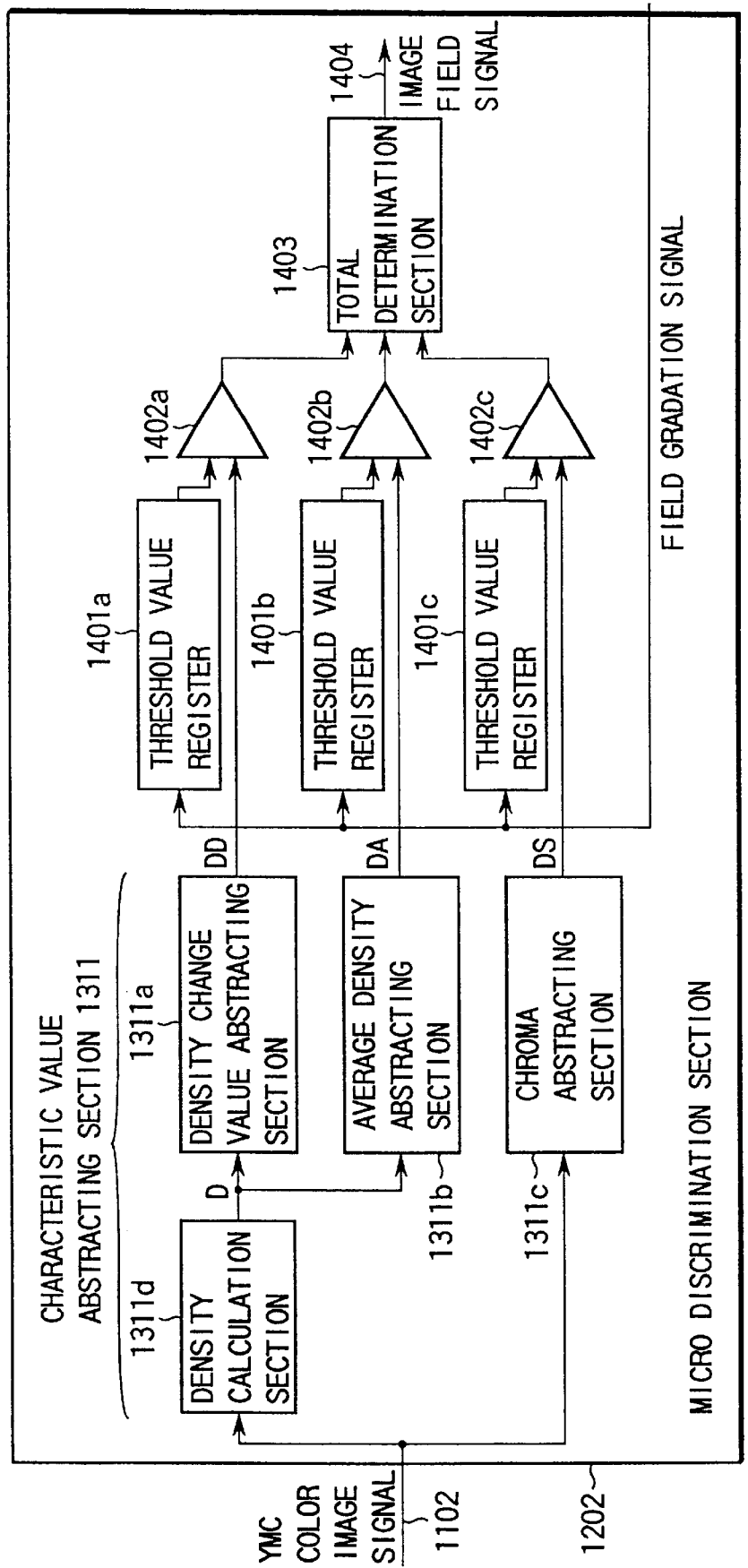
FIG. 17 is a diagram showing the structure of a micro discrimination section of a digital color copying machine according to a second embodiment of the present invention.

Examples of two-dimensional distribution between the density change value signals DD and average density signals DA in the continuous gradation field and the dot gradation field are shown in FIGS. 16 and 17, respectively. As shown in FIG. 16, the overall density change value DD is small in the continuous gradation field, while the same is somewhat large in edge portions. In this embodiment, the threshold value T6 for performing discrimination indicated with a boundary line 1103 is used to discriminate a gradation image field and edges of the gradation image field. Since gradation is expressed with dot images in the dot gradation field as shown in FIG. 17, the density change value DD is enlarged. Since removal of the dot image component from the dot gradation field causes the quality of the image to be improved, the image field signal DT is made to be "0" regardless of the characteristic value signals DD, DA and DS.

Since the conventional discrimination process using only the micro characteristics has not employed the field separation process according to this embodiment, the threshold values for the discrimination cannot be switched to be adaptable to the five types of the regions. Therefore, the conventional method has used discrimination threshold values obtainable from the same discrimination boundary as indicated by boundary lines 1810, 1910, 11010 and 11110 shown in FIGS. 14 to 15D. It leads to a fact that fine characters which are usual characters and an edge field in a gradation field do not satisfy an expected result of discrimination. Therefore, incorrect discrimination takes place and thus a satisfactory discrimination accuracy cannot be obtained.

This embodiment having the structure that the field separation is performed by the macro discrimination process followed by selecting a micro discrimination boundary suitable to each region enables accurate discrimination to be performed with high resolving power. That is, a result of discrimination (see FIG. 14) obtained from the first image field discrimination section 1312a of the micro discrimination section 1202 is selected for a region discriminated by the macro discrimination section 1201 as the usual character field (having a field separation signal "0"). A result of discrimination (see FIG. 15A to 15D) obtained from the second image field discrimination section 1312b of the micro discrimination section 1202 is selected for a region discriminated by the macro discrimination section 1201 as the characters on a background (having a field separation signal "1"). A result of discrimination (see FIG. 16) obtained from the third image field discrimination section 1312c of the micro discrimination section 1202 is selected for a region discriminated by the macro discrimination section 1201 as the continuous gradation field (having a field separation signal "2"). A result of discrimination (see FIG. 17) obtained from the fourth image field discrimination section 1312d of the micro discrimination section 1202 is selected for a region discriminated by the macro discrimination section 1201 as the dot gradation field (having a field separation signal "3"). A result of discrimination obtained from the fifth image field discrimination section 1312e of the micro discrimination section 1202 is selected for a region discriminated by the macro discrimination section 1201 as the other fields (having a field separation signal "4").

Figure 15C:
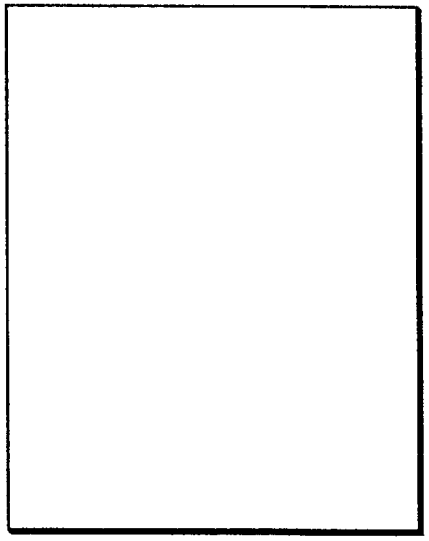
Figure 15D:
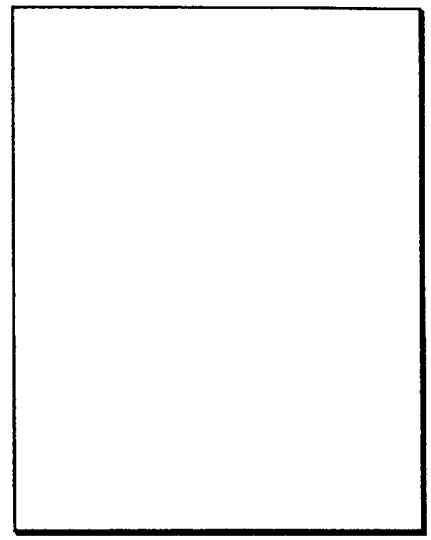
Figure 19:
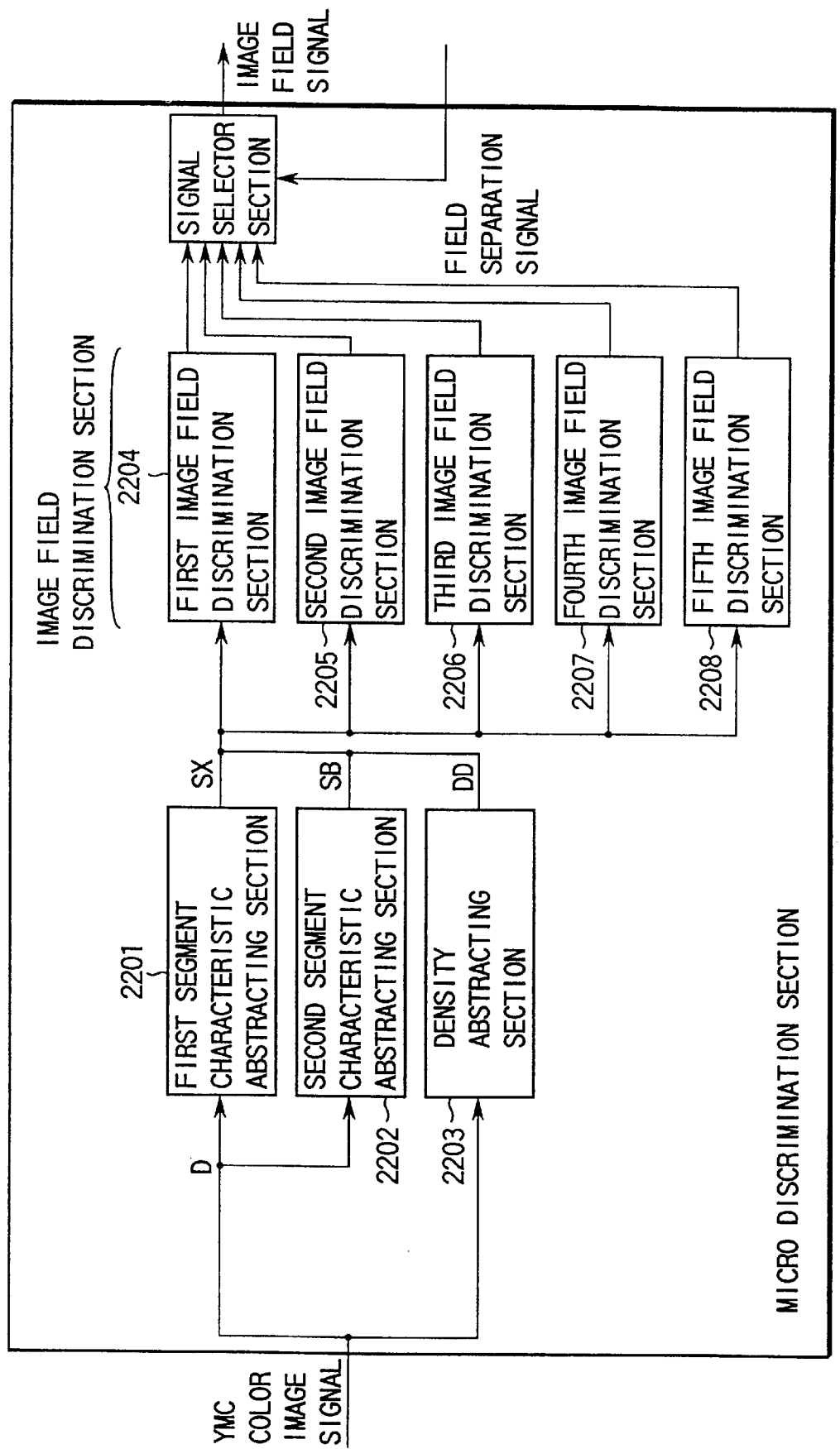
FIG. 19 is a diagram showing the structure of a micro discrimination section according to a fourth embodiment of the present invention.

Examples of discrimination of an image of an original document as shown in FIG. 9 performed by the image field discrimination sections 1312a to 1312e of the micro discrimination section 1202 are schematically shown in FIGS. 15A, 15B, 15C and 15D. Examples of selection of the image field signal DT in the discrimination signal selector section 1313 in response to the field separation signal is shown in FIG. 19. In FIGS. 15A, 15B, 15C, 15D and 16, a region having the image field signal "2", that is, a field discriminated as the character field is expressed in black. The other fields are expressed in white. FIG. 15A shows a result of discrimination performed by the first image field discrimination section 1312a, FIG. 15B shows a result of discrimination performed by the second image field discrimination section 1312b and FIGS. 15C and 15D show result of discrimination performed by the third and fourth image field discrimination sections 1312c and 1312d. As can be understood from results of comparison among FIGS. 15A, 15B, 15C, 15D and 16, the image field signal DT does not realize an accurate discrimination in the fields other than the adapted field. However, when the discrimination signal selector section 1313 selects only image field signals adaptable to the field separation signals which are results of discrimination performed by the macro discrimination section 1201, an accurate result of discrimination can be obtained with the final image field signal.

Second Embodiment

A modification of the micro discrimination section according to the first embodiment will now be described. Another example of the structure of the micro discrimination section 1202 is shown in FIG. 20. Note that the same elements as those shown in FIG. 7 are given the same reference numerals and only different elements will now be described.

As shown in FIG. 20, the micro discrimination section 1202 incorporates a density calculation section 1311d, three characteristic value abstracting sections, that is, the density change value abstracting section 1311a, average density abstracting section 1311b and the chroma abstracting section 1311c, three threshold value registers 1401a to 1401c, comparators 1402a to 1402c and a total discrimination section 1403. In each of the threshold value registers 1401a to 1401c, five discrimination threshold values corresponding to five types of fields are stored. Any one of the threshold values is selected in response to a field separation signal supplied from the macro discrimination section 1201 to the threshold value registers 1401a to 1401c. A threshold value signal transmitted from the selected threshold value register is subjected to a comparison with characteristic value signals DD, DA and DS in the comparators 1402a to 1402c. Results of the comparison are transmitted as binary comparison signals.

The comparison signals corresponding to the characteristic values are subjected to predetermined logical calculations in the total discrimination section 1403 so that a final image field signal 1404 is transmitted. The total discrimination section 1403 makes a reference to both of the supplied comparison signal and the field separation signal so as to transmit an image field signal.

As described above, a structure in which the micro discrimination section 1202 is composed of a pair of a total discrimination section and threshold value registers enables a discrimination process similar to that according to the first embodiment to be realized. Since this modification has the structure that the discrimination processes are commonly performed, the flexibility is lowered. However, the size of the circuit can be reduced as compared with the first embodiment.

Third Embodiment

Figure 18:
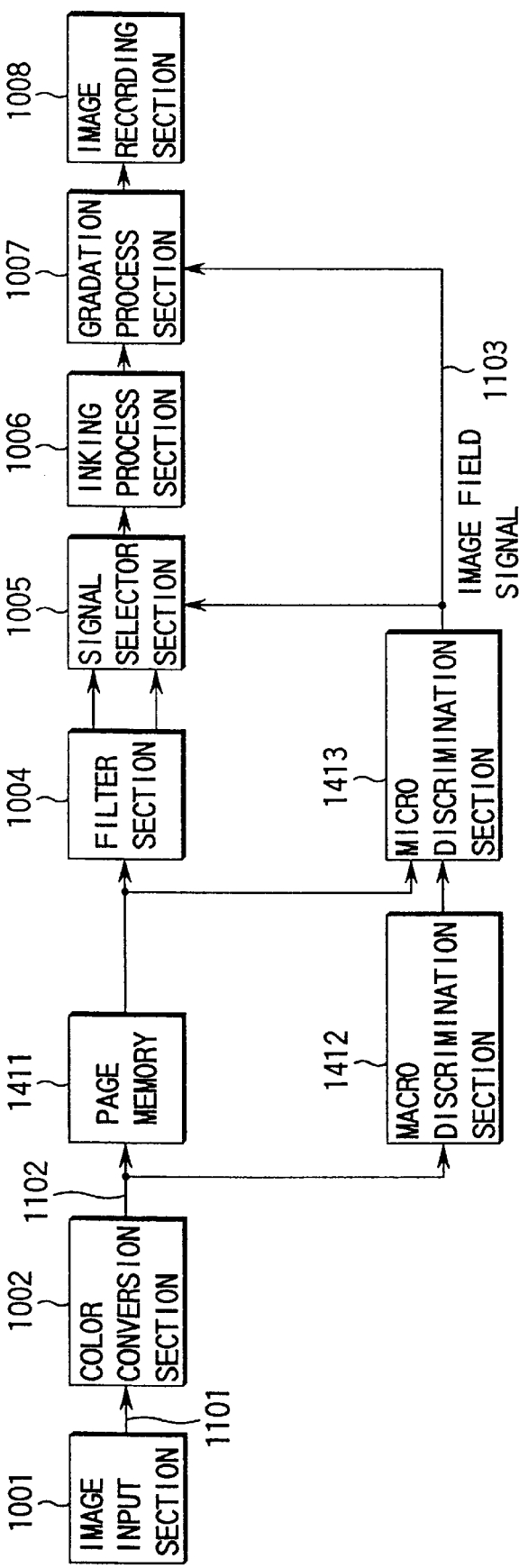
FIG. 18 is a diagram showing the structure of an essential portion of a digital color copying machine according to a third embodiment of the present invention.

Another example of a color copying machine incorporating an image processing apparatus employing the image field discrimination method according to the present invention will now be described. FIG. 18 shows an example of the structure of an essential portion of the color copying machine according to a third embodiment. The same elements as those shown in FIG. 1 are given the same reference numerals and only different elements will now be described. In the structure shown in FIG. 21, a color image signal of an image of an original document read by the image input section 1001 is allowed to pass through the color converting section 1002 so as to be stored in a page memory 1411. The foregoing structure is a remarkable difference from the first embodiment. Then, the structure and operation of this embodiment will be described briefly.

Initially, an image of an original document is read by the image input section 1001 as RGB image signals. Then, the color converting section 1002 converts the RGB image signals into color image signals indicating densities in YMC. The converted YMC color image signals 1102 for one page are stored in the page memory 1411. On the other hand, the YMC color image signal 1102 is also supplied to a macro discrimination section 1412. The macro discrimination section 1412 has a structure similar to that of the macro discrimination section 1201 of the image field discrimination section according to the first embodiment so as to perform a similar operation. That is, the YMC color image signal 1102 supplied to the macro discrimination section 1412 is separated into image data in a plurality of planes by the image separator section 1211 shown in FIG. 5. Separated image data is sequentially stored in the image memory 1212. In accordance with the program code stored in the program memory 1214, the CPU 1213 separates the fields while the CPU 1213 makes a reference to the contents of separated image data stored in the image memory 1212 so as to write a result of separation on the image memory 1212.

After the discrimination process has been completed and thus all of results of the field separation have been written on the image memory 1212, the image signals stored in the page memory 1411 are sequentially read from the same. In synchronization with the reading operation, information of field separation stored in the image memory 1212 is read through the field signal output section 1215. Since the pixel density indicated by the field separation information in the image memory 1212 and pixel density indicated by the image signal in the page memory (1411) are different from each other, the density indicated by the field separation signal is converted so that the densities of the both signals are matched with each other.

The YMC color image signal transmitted from the page memory 1411 and the field separation signal transmitted from the macro discrimination section 1412 are supplied to a micro discrimination section 1413. The structure and operation of the micro discrimination section 1413 are similar to those of the micro discrimination section 1202 according to the first embodiment. That is, characteristic value signals DD, DA and DS are, by the three characteristic value abstracting sections, generated from the supplied YMC color image signals. Then, the five image field discrimination sections 1312 generate respective image field signals from the characteristic value signals. Finally, the discrimination signal selector section 1313 selects results of discrimination (image field signals) performed by the five image field discrimination sections 1312 in response to the field separation signal transmitted from the macro discrimination section 1412 so as to transmit a final image field signal 1103.

The YMC color image signal transmitted from the page memory 1411 is allowed to pass through the filtering section 1003, the signal selector section 1005, the inking process section 1006 and the gradation process section 1007 so as to be recorded by the image recording section 1008. The signal selector section 1005 and the gradation process section 1007 switch the process thereof in response to the image field signal 1103 transmitted from the micro discrimination section 1413. Since the foregoing switching operation is similar to that according to the first embodiment, the switching operation is omitted from description.

Also the third embodiment is able to perform an image process similar to the image process which can be performed by the first embodiment. Therefore, the image field signal 1103 which is an accurate signal similar to that obtainable from the first embodiment can be obtained. When a signal process suitable to the type of the image is selected, a character field can be reproduced with a high resolution. Moreover, a gradation image field can smoothly be reproduced.

Since the third embodiment has the structure that the color image signal is stored in the page memory 1411, the necessity of reading and scanning an image of an original document two times as is required for the first embodiment can be eliminated. Therefore, the same signals can be employed to perform the macro discrimination and to read the image of the original document. Therefore, a necessity of considering an influence of deviation of the reading position which is exerted at each scanning operation can be eliminated. When the capacity of the page memory 1411 and so forth is enlarged to correspond to a plurality of pages, another original document can be read immediately after an original document has been read. Therefore, in a case where an automatic document feeder or the like is used to sequentially copy an original document composed of a plurality of pages, the sequential copying operation can be performed at a high velocity.

Although the foregoing embodiment uses change in the density, the average density and chroma as the characteristic values which are abstracted by the micro discrimination section, the abstracted values are not limited to the foregoing factors. For example, distribution of frequencies in a block or consistency with a predetermined pattern may be employed as the characteristic value.

As described above, the image copying machine according to this embodiment has the structure that the macro discrimination section 1201 uses a macro structural characteristic of an original image to separate a character field and a gradation image field from each other in response to a supplied rough image signal of an original document. Then, a result of image field discrimination DT of the original image performed by the micro discrimination section 1202 in response to a coarse image signal of the original image adaptable to the result of the separation is selected. Then, an image field signal denoting the result of the final image field discrimination is transmitted. In response to the image field signal, the processes which must be performed by the filtering section 1003 and the gradation process section 1007 are selectively switched. Thus, a character field is subjected to an edge emphasizing process and a high-resolution recording process, while a gradation image field is subjected to a multi-gradation processes. As a result, an image in which both of a character field and a gradation field in an image of the original document are satisfactorily reproduced can be generated and/or recorded. That is, the image field discrimination method and the image processing apparatus according to this embodiment are able to perform discrimination an edge of a gradation image and an edge of a character from each other which has been difficult for the conventional technique. Moreover, the method and apparatus according to this embodiment are able to perform discrimination of a character placed on a dot image and a field around the character. Moreover, the foregoing discrimination can accurately be performed with large resolving power.

When an image is encoded, switching of the encoding method by using an image field signal denoting a result of final reference numeral enables an image encoding method free from considerable distortion occurring due to the encoding process and exhibiting a high compression ratio to be realized.

Fourth Embodiment

A fourth embodiment will now be described which is a modification of the first embodiment of the present invention. Also this modification has a structure similar to that according to the first embodiment. This embodiment is different from the first embodiment in the structure of the micro discrimination section.

The structure of the micro discrimination section according to this modification is shown in FIG. 22. The micro discrimination section incorporates a first segment characteristic abstracting section 2201, a second segment characteristic abstracting section 2202, a density abstracting section 2203, a first image field discrimination section 2204, a second image field discrimination section 2205, a third image field discrimination section 2206, a fourth image field discrimination section 2207, a fifth image field discrimination section 2208 and a signal selector section 2209.

The first segment characteristic abstracting section 2201 makes a reference to an image signal in a rectangular field having a size of 5 pixels×5 pixels in the vicinity of a pixel of interest so as to detect a segment component in a vertical or horizontal direction. Then, the first segment characteristic abstracting section 2201 produces an output of a first segment characteristic value signal (SX) 2251. The foregoing signal indicates a degree of the segment structure in the rectangular field. If a vertical or a horizontal segment structure exists, a signal having a large value is transmitted. If no segment structure exists or if the density is constant, a signal having a small value is transmitted.

The second segment characteristic abstracting section 2202 detects a segment component in a diagonal direction existing in the rectangular field in the vicinity of the pixel of interest. Then, the second segment characteristic abstracting section 2202 transmits a second segment characteristic value signal (SB) 2252 indicating a degree of the diagonal segment structure in the rectangular field.

The structure and discrimination principle of the first and second segment characteristic abstracting sections are disclosed in Jan. Pat. Appln. SHUTSUGAN Pubulication No. PH10-009480 (TITLE OF THE INVENTION: IMAGE PROCESSING APPARATUS).

The density abstracting section 2204 abstracts a density component (DD) 2254 in accordance with the following formula:

$$DD = Ky \cdot Y + Km \cdot M + Kc \cdot C \text{ where } Ky\ 32\ 0.25,\ Km=0.5 \text{ and } Kc=0.25$$

The image field discrimination sections will now be described. The first to fifth image field discrimination sections perform image field discrimination processes adaptable to five types of fields separated by the field separator section, similarly to those of the first embodiment. Each of the image field discrimination sections receives the characteristic value signal transmitted from the characteristic value abstracting section so as to discriminate the image field signal. A discrimination process which is performed in each image field discrimination section is shown in FIG. 23.

This modification has a structure that the micro discrimination section employs a discrimination method on the basis of the linearity of an image element. Therefore, accuracy to discriminate a character and a dot image from each other can be improved. Therefore, this modification is suitable when reproducibility of fine characters is required.

That is, the fourth embodiment has the structure that the segment components in the main scanning direction and the sub-scanning direction. Therefore, the background field can furthermore accurately be detected. That is, if discrimination is performed simply in accordance with change in the density or the like, there is apprehension that incorrect discrimination is performed such that a background in a constant color as a character field. Since distribution of the segments (edges) in the main scanning direction and the sub-scanning direction is detected, a correct character field can be detected because a character image contains a multiplicity of segments (edge components).

As described above, the present invention is able to accurate image field discrimination of a supplied image with large resolving power. Moreover, a macro structure characteristic of an image is used to separate a character field and a gradation image field from each other. Then, a result of an image field discrimination suitable for each of the separated fields is selected so as to obtain a result of final image field discrimination. Thus, discrimination between an edge of a gradation image and an edge of a character and that between a character placed on a dot image and a field around the character, which have been difficult for the conventional technique, can accurately be performed with large resolving power.

In accordance with the result of the image field discrimination, a character field is subjected to the edge emphasizing process and a high resolution recording process. On the other hand, the gradation field is subjected to the multi-gradation process. Thus, the processes are selectively performed. Thus, images of both of the character field and the gradation field can satisfactorily be recorded.

When an image is encoded, the encoding method is switched in accordance with the result of the image field discrimination. Thus, image encoding can be performed without considerable distortion occurring because of the encoding process such that a high compression ratio is realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

first discrimination means for discriminating an original image into one of plural types of fields in response to a first image signal obtained at a first density of the original image;

characteristic value calculating means for calculating a characteristic change value in density, an average density and chroma of the original image in response to a second image signal of the original image obtained at a second density which is higher than the first density;

second discrimination means for selecting one of plural threshold values according to the type of field discriminated by the first discrimination means, and comparing the characteristic change value calculated by the characteristic value calculating means with the selected threshold value, so as to output a result of second discrimination; and image processing means for processing predetermined image processes corresponding to the result of second discrimination of the image field performed by the second discrimination means, on the second image signal.

2. An image processing apparatus according to claim 1, wherein each of the first discrimination means and the characteristic value calculating means further includes scanning means for scanning the original image at the first density and then scanning the same at the second density, respectively.

3. An image processing apparatus according to claim 1, wherein the first discrimination means includes
means for separating the original image into at least a usual character field, characters on a background, a continuous gradation field and a dot gradation field.

4. An image processing apparatus according to claim 1, further including means for deleting a gradation image existing in a field which has not been discriminated by the first discrimination means as a gradation field and a gradation image existing in a field discriminated as a continuous gradation field.

5. An image processing apparatus according to claim 1, wherein the characteristic value calculating means includes means for calculating a characteristic value of the original image in each of unit regions having different lengths in a main scanning direction and a sub-scanning direction in response to the second image signal of the original image obtained at the second density which is higher than the first density.

6. An image processing apparatus according to claim 1, wherein the characteristic value calculating means includes means for calculating a segment component of the original image in a main scanning direction and a sub-scanning direction as the characteristic coverage value in response to the second image signal of the original image obtained at the second density which is higher than the first density.

7. An image processing method comprising the steps of:
a first discrimination step for discriminating an original image into one of plural types of fields in response to a first image signal obtained at a first density of the supplied original image;
a characteristic value calculating step for calculating a characteristic change value in density, average density, and chroma of the original image in response to a second image signal of the original image obtained at a second density which is higher than the first density;
a second discrimination step for selecting one of plural threshold values according to the one of the plural types of fields discriminated by the first discrimination step, and comparing the characteristic change value calculated by the characteristic value calculating step with the selected threshold value, so as to output a result of second discrimination step; and
an image processing step for processing predetermined image processes corresponding to the result of second discrimination step of the image field, on the second image signal.

8. An image processing method according to claim 7, wherein the first discrimination step includes scanning the original image at the first density and the characteristic value calculating step includes scanning the original image at the second density.

9. An image processing method according to claim 7, wherein the first discrimination step includes separating the original image into at least a usual character field, characters on a background, a continuous gradation field and a dot gradation field.

10. An image processing method according to claim 7, further including deleting a gradation image existing in a field which has not been discriminated in the first discrimination step as a gradation field and a gradation image existing in a field discriminated as a continuous gradation field.

11. An image processing method according to claim 7, wherein the characteristic value calculating step includes calculating a characteristic value of the original image in each of unit regions having different lengths in a main scanning direction and a sub-scanning direction in response to the second image signal of the original image obtained at the second density which is higher than the first density.

12. An image processing method according to claim 7, wherein the characteristic value calculating step includes calculating a segment component of the original image in a main scanning direction and a sub-scanning direction as the characteristic change value in response to the second image signal of the original image obtained at the second density which is higher than the first density.

* * * * *